(12) United States Patent
Freeburne (10) Patent No.: US 8,170,545 B1
(45) Date of Patent: May 1, 2012

(54) INFORMATION TECHNOLOGY SUPPORT SYSTEM AND METHOD

(75) Inventor: Alexander Benton Freeburne, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 598 days.

(21) Appl. No.: 11/671,349

(22) Filed: Feb. 5, 2007

(51) Int. Cl.
| | |
|---|---|
| H04W 24/00 | (2009.01) |
| H04M 3/00 | (2006.01) |
| H04M 3/42 | (2006.01) |
| H04M 9/00 | (2006.01) |
| H04B 17/00 | (2006.01) |
| G06F 15/173 | (2006.01) |

(52) U.S. Cl. ..... 455/423; 455/418; 455/419; 455/414.1; 455/67.11; 709/224; 379/433.01

(58) Field of Classification Search .................. 707/102; 709/224; 455/414.1, 432.3, 67.11, 557, 418–420, 455/423–425; 714/2, 26; 379/433.01
See application file for complete search history.

(56) References Cited

U.S. PATENT DOCUMENTS

| | | | | |
|---|---|---|---|---|
| 6,542,898 B1 * | 4/2003 | Sullivan et al. | ............... | 707/102 |
| 6,697,969 B1 * | 2/2004 | Merriam | ........................ | 714/46 |
| 7,293,201 B2 * | 11/2007 | Ansari | ........................ | 714/38.14 |
| 7,296,258 B2 * | 11/2007 | Beckert et al. | ................. | 717/127 |
| 7,313,613 B1 * | 12/2007 | Brooking et al. | .............. | 709/223 |
| 2004/0058652 A1 * | 3/2004 | McGregor et al. | .......... | 455/67.13 |
| 2004/0203755 A1 * | 10/2004 | Brunet et al. | .............. | 455/432.1 |
| 2005/0027827 A1 * | 2/2005 | Owhadi et al. | ................. | 709/219 |
| 2005/0114753 A1 * | 5/2005 | Kumar et al. | ............... | 715/500.1 |
| 2006/0031476 A1 * | 2/2006 | Mathes et al. | ................. | 709/224 |
| 2006/0052921 A1 * | 3/2006 | Bodin et al. | ..................... | 701/33 |
| 2006/0234698 A1 * | 10/2006 | Fok et al. | ........................ | 455/425 |
| 2006/0282704 A1 * | 12/2006 | Morgan et al. | .................. | 714/26 |
| 2007/0168967 A1 * | 7/2007 | Chopra et al. | ................. | 717/124 |
| 2007/0174658 A1 * | 7/2007 | Takamoto et al. | ................. | 714/4 |
| 2007/0207800 A1 * | 9/2007 | Daley et al. | .................... | 455/425 |
| 2007/0211965 A1 * | 9/2007 | Helbing et al. | ............... | 382/313 |
| 2007/0294560 A1 * | 12/2007 | Muthukumarasamy et al. | . | 714/2 |
| 2008/0084992 A1 * | 4/2008 | Peddireddy et al. | ..... | 379/433.01 |
| 2008/0084993 A1 * | 4/2008 | Peddireddy et al. | ..... | 379/433.01 |

* cited by examiner

*Primary Examiner* — Marivelisse Santiago Cordero
*Assistant Examiner* — Mong-Thuy Tran (57) ABSTRACT

A computer support tool is provided. The tool includes diagnostic software and a user interface. The diagnostic software identifies information associated with a computer problem, wherein the information is based on the needs of help desk personnel. The user interface informs a user of the information associated with the computer problem, and suggests a self help option for the user to address the computer problems.

14 Claims, 5 Drawing Sheets

INFORMATION TECHNOLOGY SUPPORT SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many technological innovations offer additional capabilities to information technology users, but innovations also make technology more complicated to use. For example, enterprises employ help desk personnel to assist computer users with a wide array of problems which computer users are poorly equipped to address. Many users are unfamiliar with the most common computer problems and the causes of such problems, and have difficulty in determining what information to provide to the help desk personnel to solve the problems encountered. Additionally, the help desk personnel know little about the operating history of each computer in the enterprise, and spend significant amounts of unproductive time attempting to guide computer users to solve various computer problems.

The above described situation presents unique problems that are not adequately or efficiently addressed by existing information technology support systems.

SUMMARY

Accordingly, various information technology support systems and methods are disclosed herein. In some system embodiments, a computer support tool includes diagnostic software and a user interface. The diagnostic software identifies information associated with a computer problem, wherein the information is based on the needs of help desk personnel. The user interface informs a user of the information associated with the computer problem, and suggests a self help option for the user to address the computer problem.

In some computer support method embodiments, information associated with a computer problem is identified, wherein the information is based on the needs of help desk personnel. A user is informed of the information associated with the computer problem. A self help option is suggested for the user to address the computer problem.

In yet another system embodiment, a mobile device support tool includes diagnostic software and a user interface. The diagnostic software identifies information associated with a mobile device problem, wherein the information is based on the needs of help desk personnel. The user interface informs a user of the information associated with the mobile device problem, and suggests a self help option for the user to address the mobile device problem.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although specific implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

Various methods and systems of information technology support are provided. In some system embodiments, diagnostic software identifies information that is helpful for help desk personnel to assist computer users to correct computer problems. The user interface displays the information to a computer user and offers self help options that are used to correct computer problems. In some embodiments, the user interface responds to user input by executing an offered self help option. By making information to the computer user based on the needs of the help desk personnel, often the computer user can use this information to correct the problem without contacting the help desk personnel. If the computer user cannot correct the problem, the help desk personnel can use the information displayed to the computer user to quickly correct the problem. In other system embodiments, the diagnostic software identifies information helpful for the help desk personnel to assist mobile device users to correct mobile device problems, and the user interface offers self help options used to correct mobile device problems.

Figure 1:
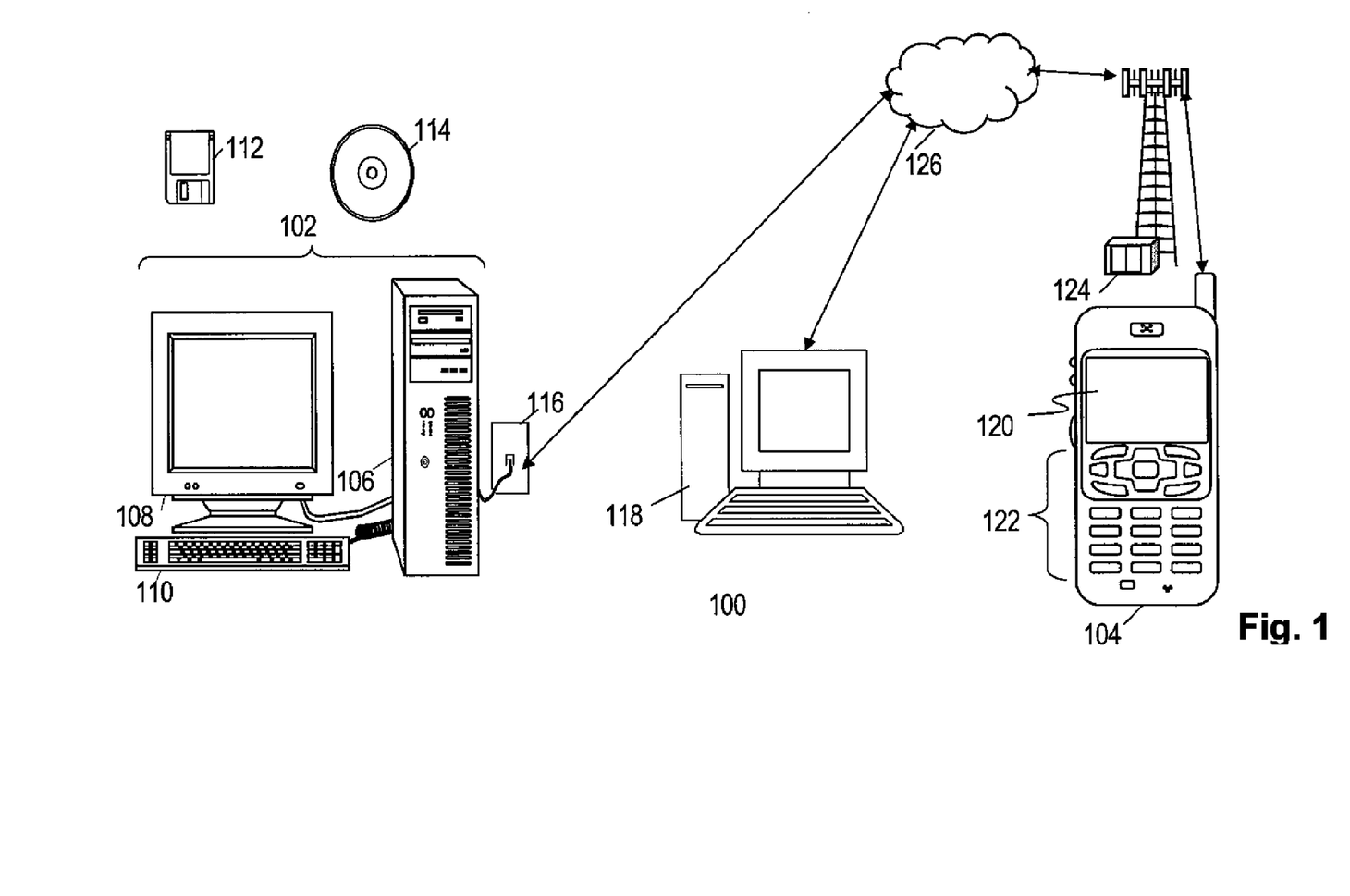
FIG. 1 shows an illustrative information technology support system according to some embodiments of the present disclosure.

FIG. 1 shows an illustrative system 100 for implementing information technology support methods according to some embodiments of the present disclosure. The system 100 is shown as including a desktop computer 102 and a mobile device 104, although any electronic device having some amount of computing power coupled to a user interface may be configured to carry out aspects of the methods disclosed herein. Among other things, servers, portable computers, and personal digital assistants (PDAs) may be configured to carry out aspects of the disclosed information technology support methods. While one desktop computer and one mobile device are shown in FIG. 1, other desktop computers and mobile devices could be present.

As shown, the desktop computer 102 comprises a chassis 106, a display 108, and an input device 110. The chassis 106 comprises a processor, memory, and information storage devices. One or more of the information storage devices may store programs and data on removable storage media such as a floppy disk 112 or an optical disc 114. The chassis 106 may further comprise a network interface 116 that allows the desktop computer 102 to receive information via a wired or wireless network, represented in FIG. 1 by a phone jack.

The chassis 106 is coupled to the display 108 and the input device 110 to interact with a user of an information technology support system. The display 108 and the input device 110 may together operate as a user interface. The input device 110 is shown as a keyboard, but may take many alternative forms such as a keypad, a camera, a microphone, or other means for receiving information from a user, information such as a request to execute an information technology support method.

The desktop computer 102 may communicate through the network interface 116 to a help desk workstation 118, where help desk personnel work to assist users of information technology. While one help desk workstation is shown in FIG. 1, other help desk workstations could be present. The desktop computer 102 may communicate information associated with a computer problem to the help desk workstation 118. The help desk workstation 118 may communicate with the desktop computer 102 through the network interface 116.

Though illustrated as a mobile phone, the mobile device 104 may take various forms including a personal digital assistant (PDA), a mobile computer, a digital camera, a digital music player, a digital calculator, and an electronic key fob for keyless entry. Many suitable mobile devices combine some or all of these functions.

The mobile device 104 includes a display 120 and a touch-sensitive surface or keys 122 with which to interact with a user. The mobile device 104 may present options for the user to select, controls for the user to actuate, and/or cursors or other indicators for the user to direct. The mobile device 104 may further accept data entry from the user, including numbers to dial or various parameter values for configuring the operation of the mobile device 104. The mobile device 104 may further execute one or more software or firmware applications in response to user commands. These applications may include diagnostic software to configure the mobile device 104 to perform various customized functions in response to user interaction, such as identifying information associated with a mobile device problem, where the information is based on the needs of the help desk personnel.

The mobile device 104 may communicate through a cell tower 124 and a wired network 126 to the help desk workstation 118. The mobile device 104 may communicate information associated with a mobile device problem to the help desk workstation 118. The help desk workstation 118 may communicate with the mobile device 104 through the wired network 126 and the cell tower 124 by a standard wireless telephony protocol (such as code division multiple access) or some other means of wireless communication.

Figure 2:
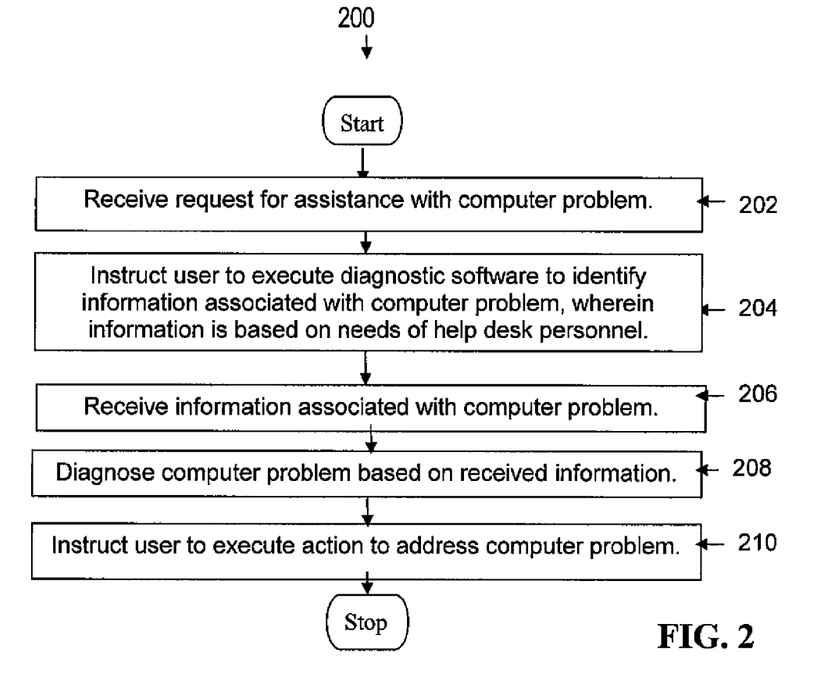
FIG. 2 shows an illustrative information technology help desk support method according to some embodiments of the present disclosure.

Turning now to FIG. 2, an illustrative information technology help desk support method is depicted according to some embodiments of the present disclosure. The method enables the help desk personnel working at the help desk workstation 118 to support users of information technology to address information technology problems. Although the description of the information technology to which the FIG. 2. method applies is the desktop computer 102, in some embodiments the method applies equally to the mobile device 104.

In box 202, the help desk workstation 118 receives a request for assistance with a computer problem. For example, a user of the desktop computer 102 sends a request e-mail that requests assistance with the display 108 to the help desk workstation 118. Alternatively, if the user of the desktop computer 102 does not have network connectivity to communicate by e-mail, the user can use a telephone to communicate with the help desk personnel at the help desk workstation 118.

In box 204, the help desk workstation 118 instructs a user to execute diagnostic software to identify information associated with the historic computer problem, wherein the information is based on the needs of the help desk personnel. The historic computer problem is a computer problem that the help desk personnel have previously addressed and a problem for which the help desk personnel previously recorded information. Based on the historical nature of the computer problem, the help desk personnel can determine what type of instructions to send to the user. For example, the help desk workstation 118 sends an instruction e-mail to the user of the desktop computer 102, wherein the instruction e-mail instructs the user of the desktop computer to activate the diagnostic software to identify information associated with the display 108, wherein the information is based on the needs of the help desk personnel.

In box 206, the help desk workstation 118 receives information associated with the computer problem. For example, the user of the desktop computer 102 sends information associated with the display 108, as generated by the diagnostic software, in an information e-mail to the help desk personnel at the help desk workstation 118.

In box 208, the help desk workstation 118 diagnoses the computer problem based on the received information. For example, the help desk personnel at the help desk workstation 118 evaluate the information e-mail that includes information associated with the display 108, as generated by the diagnostic software. Continuing this example, the help desk personnel at the help desk workstation 118 compare the information associated with the display 108 with previously recorded information associated with the display 108 and/or previously recorded information associated with other displays to diagnose the problem with the display 108. Further to this example, the help desk personnel at the help desk workstation 118 compare the screen resolution associated with the display 108 with previously recorded screen resolutions associated with the display 108 to diagnose that the problem with the display 108 may be due to the current settings for the screen resolution of the display 108.

In box 210, the help desk workstation 118 instructs the user to execute an action to address the computer problem. For example, the help desk personnel at the help desk workstation 118 send a corrective e-mail to the user of the desktop computer 102, wherein the corrective e-mail instructs the user to execute an action to modify the settings for the screen resolution of the display 108 to a previously recorded setting for the screen resolution of the display 108.

Figure 3:
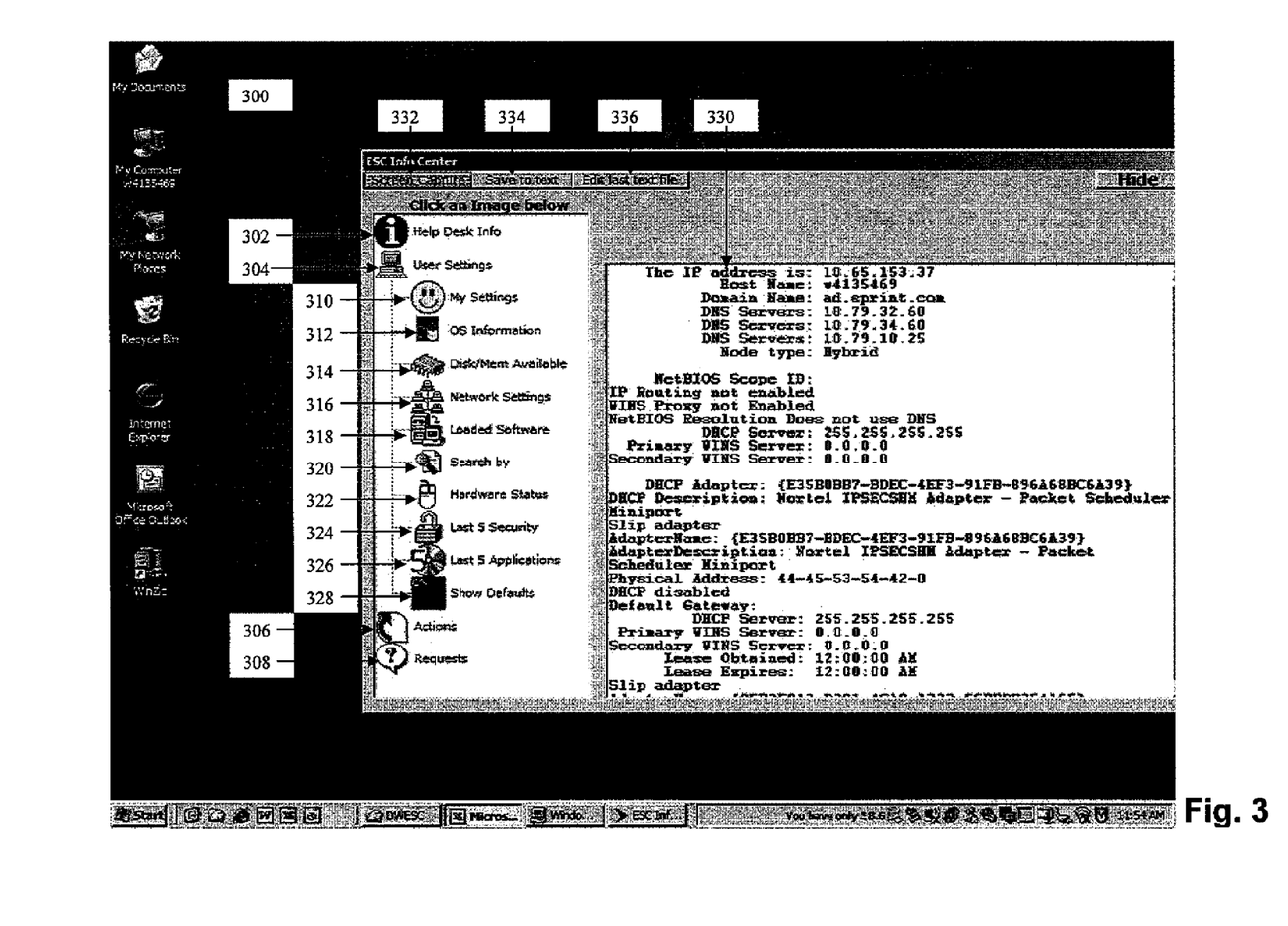
FIG. 3 shows an illustrative information technology support display according to some embodiments of the present disclosure.

Turning now to FIG. 3, an illustrative information technology support display 300 is depicted according to some embodiments of the present disclosure. An information technology support display offers selections and sub-selections to assist a user of information technology in diagnosing problems and choosing self help options to correct the problems. The display 300 includes a "help desk info" 302 selection, a "user settings" 304 selection, an "actions" 306 selection, and a "requests" 308 selection. The "user settings" 304 selection includes a "my settings" 310 sub-selection, an "OS information" 312 sub-selection, a "disk/mem available" 314 sub-selection, a "network settings" 316 sub-selection, a "loaded software" 318 sub-selection, a "search by" 320 sub-selection, a "hardware status" 322 sub-selection, a "last 5 security" 324 sub-selection, a "last 5 applications" 326 sub-selection, and a "show default" 328 sub-selection. All of these selections are automatically performed at startup, and on a determined schedule, to record these settings for later examination when an examination of state change in these settings needs to be performed. The numbers and types of selections and sub-selections are depicted for the purpose of an illustrative example only, as the display 300 can include any number or types of selections and sub-selections. Although the description of information technology to which the display 300 applies is the desktop computer 102, in some embodiments the display 300 applies equally to the mobile device 104.

Selecting the "help desk info" 302 selections displays an internet address for a help desk website, an e-mail address and a telephone number to contact the help desk personnel, and expanded tips on how to use the selections and sub-selections on the display 300. Selecting the "user settings" 304 selections displays the sub-selections 310-328. Selecting the "actions" 306 selection displays sub-selections that enable a user to execute actions, such as actions to activate a graphic ping, a graphic trace route, an Internet protocol release, and an Internet protocol renew. Selecting the "requests" 308 selection displays sub-selections that enable a user to generate requests, such as a request for more information on any topic, a request for hardware repair, and a request for a software repair.

Selecting the "my settings" 310 sub-selection enables a user to view computer settings, such as state change information, a comparison of current user settings against user settings previously recorded, and information such as the last time that the desktop computer 102 completed a reboot. Selecting the "OS information" 312 sub-selection enables a user to view operating system information, such as the identity and version of the currently running operating system.

Selecting the "disk/mem available" 314 sub-selection enables a user to view the amount of available memory and disk space, including network storage space, and in some embodiments also enables the user to view processor usage information and memory usage information. In some embodiments, usage information is determined and recorded automatically, such as on an hourly basis, by the diagnostic software running in the background. In some embodiments, usage information is periodically collected over a network by a system management server, such as on a monthly basis, to provide the help desk personnel with information for diagnosing problems. For example, if the desktop computer 102 normally has an average processor usage of 10% over the last month and other desktop computers normally have a processor usage ranging between 3% and 7% over the last month, the abnormally high processor usage indicates the need to consider upgrading the processor on the desktop computer 102.

Selecting the "network settings" 316 sub-selection enables a user to view various network settings, such as the network settings depicted in a textbox 330. Many of the network settings depicted in the textbox 330 are server information, which can enable a user to address a computer problem and which can enable the help desk personnel to diagnose a computer problem. The user can select the "screen capture" 332 option to capture an image of the screen, including information such as the information depicted in textbox 330. The user can refer to the captured image of the textbox 330 at a later time to determine which actions to take to address a computer problem. Additionally, the user can send the captured image of the textbox 330 to the helpdesk workstation 118 to request assistance with the computer problem. If the desktop computer 102 lacks network connectivity, preventing the user from e-mailing the captured image of the textbox 330 to the help desk workstation 118, the user can select a "save to text" 334 option. By selecting the "save to text" 334 option, the user can make a text copy of the textbox 330 that can be copied to removable media, such as the floppy disc 112, USB Memory, the optical disc 114, or any other removable media available, which can then be used to convey a text copy of the textbox 330 to the help desk personnel at the help desk workstation 118. The user can select an "edit last text file" 336 option to perform searches on the text copy of the textbox 330 as instructed by the help desk personnel. This option may be particularly helpful for telephone conversations with the help desk personnel.

Selecting the "loaded software" 318 sub-selection enables a user to view the software applications currently loaded on the desktop computer 102, such as a spreadsheet application and a word processor application. Selecting the "search by" 320 sub-selection enables a user to search the information on the desktop computer 102, as instructed by a self help option or by the help desk personnel at the help desk workstation 118. This search information can be loaded into a text file, where large amounts of data can then be further broken down using the "search by" 320 sub-selection. It would not be uncommon to have search results number in the thousands, making sub-searches desirable. For example, a user searches the desktop computer 102 for files with the extension "bho" to identify all files associated with browser help objects to address a browser problem. Selecting the "hardware status" 322 sub-selection enables a user to view the identity and condition of hardware associated with the desktop computer 102, such as which disk drives and which printers are available for the desktop computer 102.

Selecting the "last 5 security" 324 sub-selection enables a user to view the last 5 security bulletins received, security bulletins actively linked for the desktop computer 102. A list of the most recently linked security bulletins can enable a user to identify the cause of a problem that began shortly after the recent linking of a security bulletin. Selecting the "last 5 applications" 326 sub-selection enables a user to view the last 5 software applications loaded on or pushed to the desktop computer 102. A list of the most recently installed software applications can enable a user to identify the cause of a problem that began shortly after the recent installation of a software application. Selecting the "show defaults" 328 sub-selection enables a user to view default settings, such as a default disk drive, a default server, and a default printer.

Figure 4:
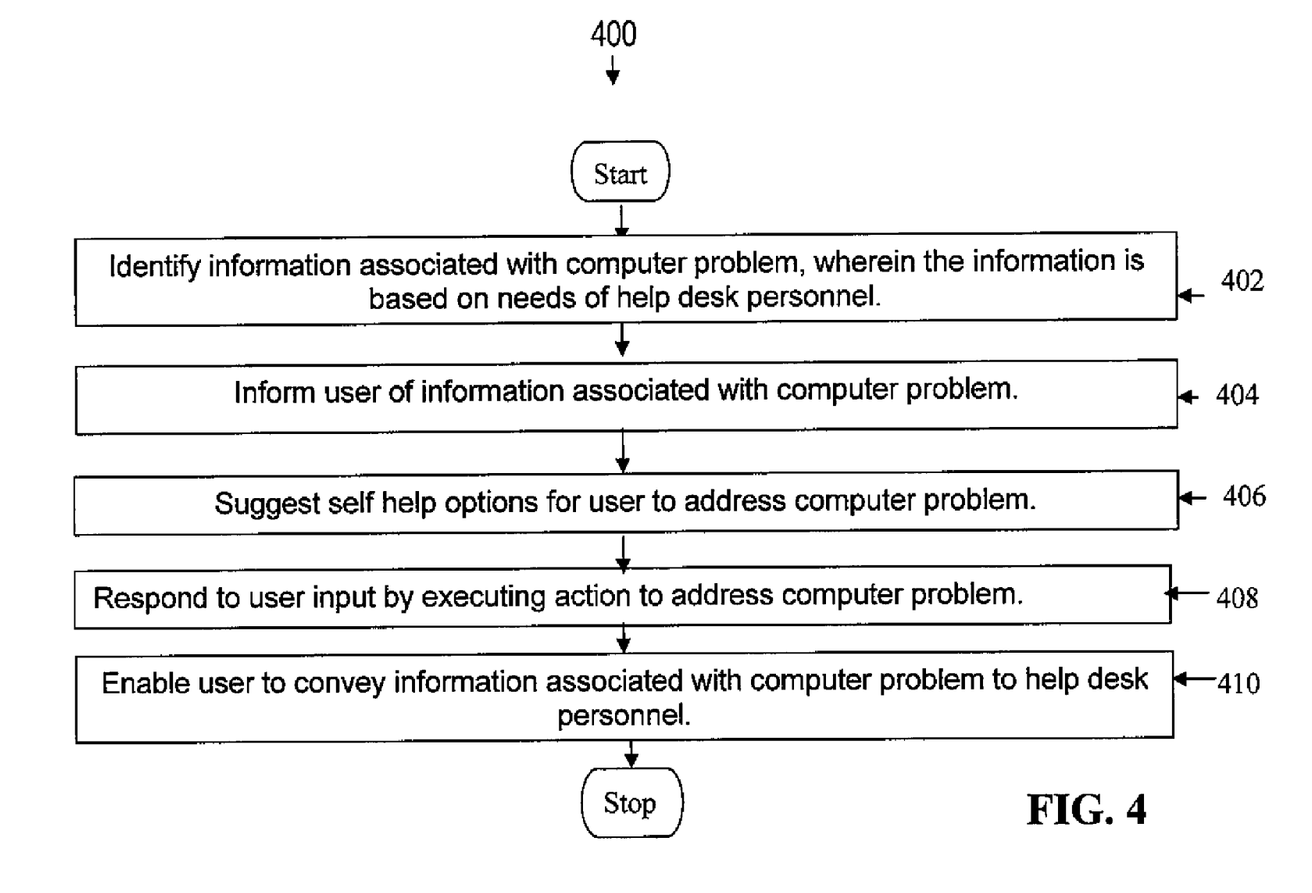
FIG. 4 shows an illustrative information technology support method according to some embodiments of the present disclosure.

Turning now to FIG. 4, an illustrative information technology support method is depicted according to some embodiments of the present disclosure. The method enables an information technology user to execute actions, including self help options, to address information technology problems. Although the description of the information technology to which the FIG. 4. method applies is the desktop computer 102, in some embodiments the method applies equally to the mobile device 104.

In box 402, diagnostic software identifies information associated with computer problems, wherein the information is based on the needs of the help desk personnel. The diagnostic software identifies information by making live application program interface calls directly to the operating system of the desktop computer 102. For example, a problem with a network link prompts the user to select the "network settings" 316 sub-selection, which executes the diagnostic software to identify information associated with network settings, such as the status of the network link. Alternatively, in some embodiments the diagnostic software runs automatically in the background, without the need for execution by the user. The diagnostic software running in the background can periodically evaluate information associated with various computer problems, such as the amount of disk space available on the default hard drive. The diagnostic software has the capability of automatically taking action to address the computer problem for certain pre-defined problems for which a solution is readily available and user options are limited.

In some embodiments, the subject technology is the mobile device 104 and the diagnostic software automatically evaluates information associated with various mobile device problems, such as insufficient space to store a picture taken by the mobile device camera. The diagnostic software automatically monitors other mobile device problems, such as keys that stick, pixels that are burn out, internal temperatures outside of normal operating ranges, a battery used beyond its expected lifetime, backlights growing dim, deteriorated audio quality, and various camera problems. Performance and state change information is recorded for all electronic hardware of the mobile device 104 for use by the mobile device user and help desk personnel. In the event that such information indicates issues with the hardware, the mobile device user is directed on what to report, how to report it, or, if possible, how to correct the mobile device problem.

In box 404, a user interface informs a user of information associated with the computer problem. For example, the display 108 displays the information associated with the network link, as identified by the diagnostic software, to the user. Alternatively, in some embodiments the diagnostic software that runs automatically in the background unobtrusively displays the information associated with insufficient space available on the default hard drive by scrolling a message across the system tray. The system tray may only permit display of square icons. By adding additional icons that contain text notification for the user to the currently displayed icons in the system tray, embodiments of the present disclosure use the system tray icon capability to progressively stagger the display of the text notification within the additional icons, giving the appearance to the user of a marquee message scrolling across the system tray. The user does not have the option of suppressing such a message.

In box 406, the user interface suggests self help options for the user to address the computer problem. For example, the display 108 lists the five most common causes for computer problems with the network link, with each cause followed by a suggested action for the user to take to address the network link problem. Based on the record of computer problems, the help desk personnel can modify such a list of the most common causes periodically by adding causes and actions for increasingly common problems, deleting causes and actions for decreasingly common problems, and modifying the order of the causes and actions listed, based on the changing frequencies of problems. Alternatively, in some embodiments the display 108 lists a web link to guide the user in addressing the computer problem with the network link.

In box 408, the user interface responds to user input by executing an action to address the computer problem. For example, the user executes a suggested action listed on the display 108 to address the computer problem with the network link. Continuing this example, the user follows the suggested action by selecting the "actions" 306 selection, and executing an Internet protocol release and an Internet protocol renew to address the problem with the network link. Alternatively, in some embodiments the user executes an action listed at the web link to address the computer problem with the network link.

In box 410, the user interface enables the user to convey information associated with the computer problem to the help desk. If the self help options have not assisted the user in addressing the computer problem, the user has the option of contacting the help desk personnel at the help desk workstation 118 for assistance. For example, the user uses the keys 110 to select the "screen capture" 332 option or the "save to text" 334 option for the display 108, as described above in the description for FIG. 3, to capture an image of the textbox 330. Continuing this example, the user sends the captured image of the textbox 330 to the help desk personnel at the helpdesk workstation 118, by e-mail, removable media, such as the floppy disc 112, USB Memory, the optical disc 114, or any other removable media available, to request assistance with the computer problem. Further to this example, the help desk personnel at the help desk workstation 118 assist the user with the user problem by executing the actions listed in FIG. 2.

Figure 5:
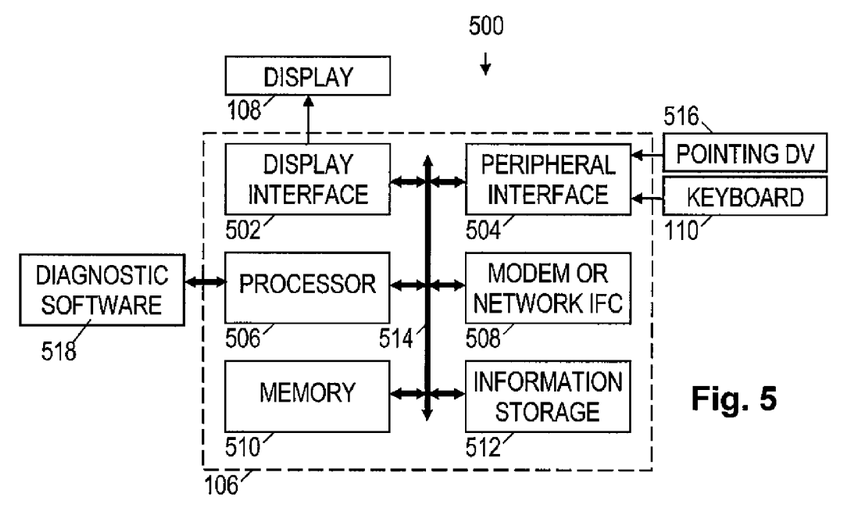
FIG. 5 shows a block diagram of an illustrative information technology support computer according to some embodiments of the present disclosure.

FIG. 5 shows a simplified functional block diagram 500 of the desktop computer 102 system according to some embodiments of the present disclosure. The chassis 106 may comprise a display interface 502, a peripheral interface 504, a processor 506, a modem or other suitable network interface 508, a memory 510, an information storage device 512, and a bus 514. The desktop computer 102 may be a bus-based computer, with the bus 514 interconnecting the other elements and carrying communications between them. The display interface 502 may take the form of a video card or other suitable display interface that accepts information from the bus 514 and transforms it into a form suitable for the display 108. Conversely, the peripheral interface 504 may accept signals from the keyboard 110 and other input devices such as a pointing device 516, and transform them into a form suitable for communication on the bus 514.

The processor 506 gathers information from other system elements, including input data from the peripheral interface 504, and program instructions and other data from the memory 510, the information storage device 512, or from a remote location via the network interface 508. The processor 506 carries out the program instructions and processes the data accordingly. The program instructions may further configure the processor 506 to send data to other system elements, comprising information for the user which may be communicated via the display interface 502 and the display 108, information such as information associated with a computer problem, wherein the information is based on the needs of the help desk personnel.

The network interface 508 enables the processor 506 to communicate with remote systems via a network. The memory 510 may serve as a low-latency temporary store of information for the processor 506, and the information storage device 512 may serve as a long term (but higher latency) store of information, including information such as information associated with a computer problem, wherein the information is based on the needs of the help desk personnel.

The processor 506, and hence the desktop computer 102 as a whole, operates in accordance with one or more programs stored on the information storage device 512. The processor 506 may copy portions of the programs into the memory 510 for faster access, and may switch between programs or carry out additional programs in response to user actuation of the input device, programs such as diagnostic software 518. The additional programs may be retrieved from the information storage device 512 or may be retrieved from remote locations via the network interface 508. One or more of these programs configures the desktop computer 102 system to execute the diagnostic software 518 to carry out at least one of the computer support methods disclosed herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

What is claimed is:

1. A mobile device, comprising:
   a non-transitory memory;
   a mobile device support tool comprising diagnostic software embodied in the non-transitory memory to identify diagnostic information associated with a mobile device problem experienced by the mobile device, wherein the diagnostic information is the same diagnostic information provided to help desk personnel, and wherein the diagnostic information comprises processor usage information of the mobile device, memory usage information of the mobile device, information about a configuration of a server with which the mobile device communicates to enable a mobile device user to address the mobile device problem, and an amount of network storage space available for the mobile device to enable the mobile device user to address the mobile device problem; and
   a user interface to inform the mobile device user of the diagnostic information associated with the mobile device problem, and to suggest a self help option for the mobile device user to address the mobile device problem, wherein the user interface is further operable to enable the mobile device user to capture an image of the diagnostic information associated with the mobile device problem and to convey the captured image to the help desk personnel.

2. The tool of claim 1 wherein the self help option includes a web link to guide the mobile device user in addressing the mobile device problems.

3. The tool of claim 1 wherein the diagnostic software identifies information associated with the mobile device problem based on a record of mobile device information.

4. The tool of claim 1 wherein the user interface is further operable to enable the mobile device user to convey the diagnostic information associated with the mobile device problem to the help desk personnel.

5. The tool of claim 1, wherein the diagnostic software runs automatically in the background on the mobile device to monitor mobile device conditions.

6. The tool of claim 5, wherein the diagnostic software runs automatically in the background on the mobile device to monitor keys that stick.

7. The tool of claim 5, wherein the diagnostic software runs automatically in the background on the mobile device to monitor pixels that are burnt out.

8. The tool of claim 5, wherein the diagnostic software runs automatically in the background on the mobile device to monitor internal temperatures outside of normal operating ranges.

9. The tool of claim 5, wherein the diagnostic software runs automatically in the background on the mobile device to monitor a backlight growing dim.

10. The tool of claim 1, wherein the user interface further lists a list of five common causes of the mobile device problem, wherein a suggested action is listed for each one of the five common causes.

11. A computer support method, comprising:
    identifying, by a computer, diagnostic information associated with a computer problem experienced by the computer, wherein the diagnostic information is the same diagnostic information provided to help desk personnel, and wherein the diagnostic information comprises processor usage information, memory usage information, information about a configuration of a server with which the computer communicates to enable a computer user to address the computer problem, and an amount of network storage space available for the computer to enable the computer user to address the mobile device problem;
    informing the computer user of the diagnostic information associated with the computer problem;
    suggesting, by the computer, a self help option for the computer user to address the computer problem;
    enabling the computer user to capture an image of the diagnostic information associated with the computer problem; and
    enabling the computer user to convey the captured image to the help desk personnel.

12. The method of claim 11 further comprising responding to user input by executing an action to address the computer problem.

13. The method of claim 11 wherein the self help option includes a web link to guide the computer user in addressing the computer problem.

14. The method of claim 11 wherein identifying diagnostic information associated with the computer problem is based on a record of computer information.

* * * * *